Figure 1A:
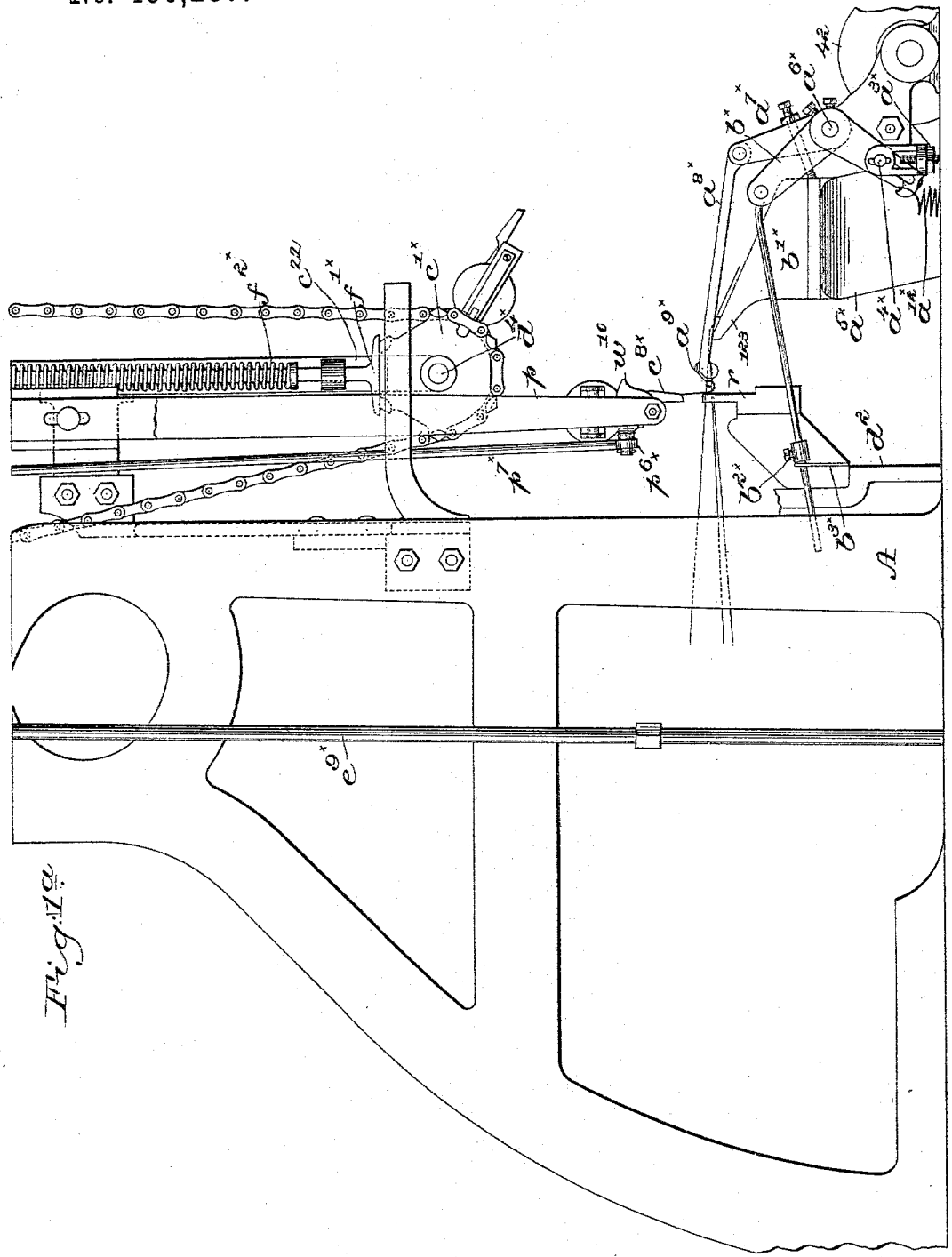

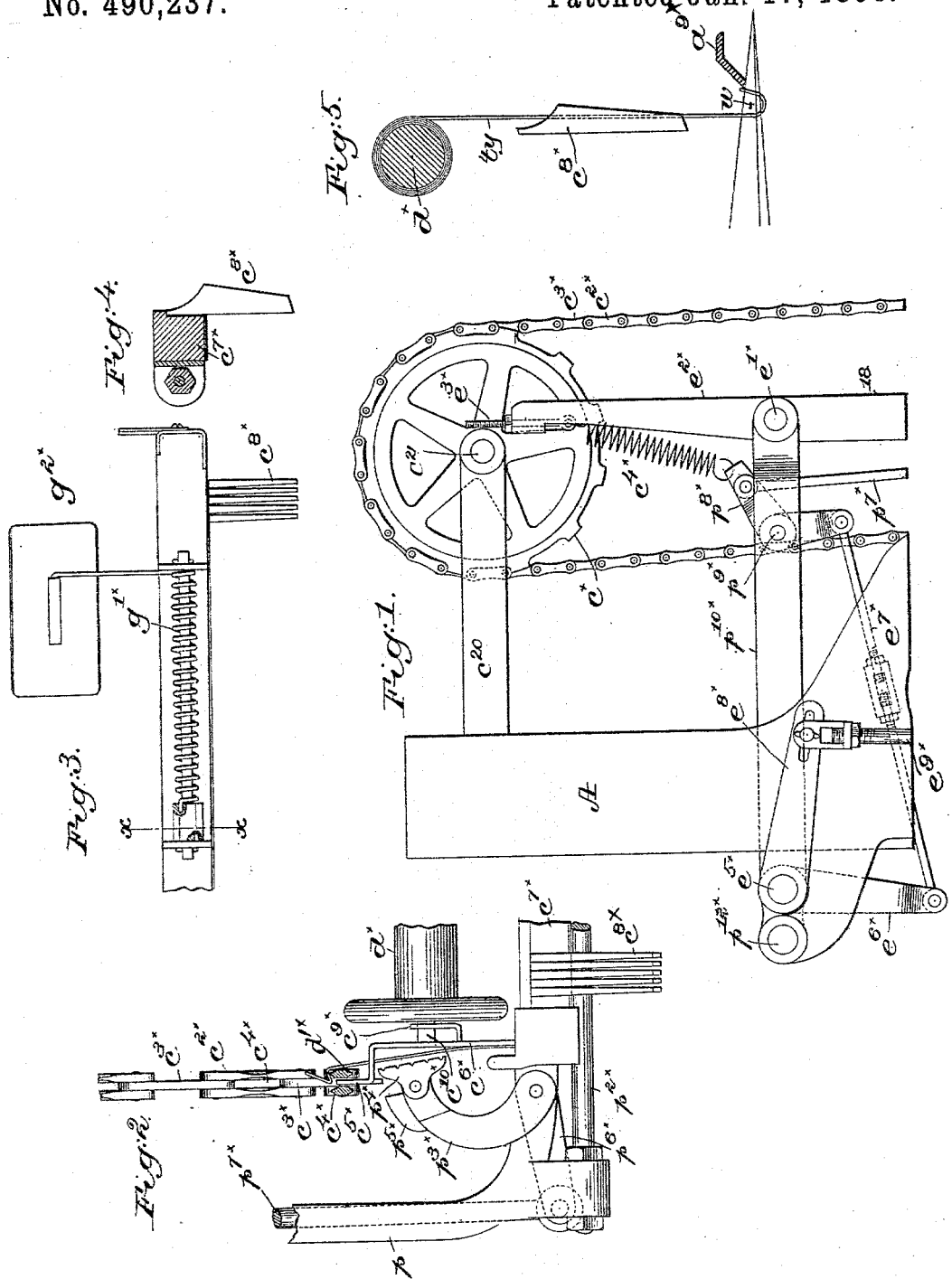

(No Model.) 7 Sheets—Sheet 2.

H. WYMAN & J. A. CLARK.
LOOM FOR WEAVING TUFTED FABRICS.

No. 490,237. Patented Jan. 17, 1893.

Witnesses.
Fred S. Greenleaf.
Louis N. Gowell.

Inventors.
Horace Wyman
John A. Clark
by Crosby & Gregory Attys

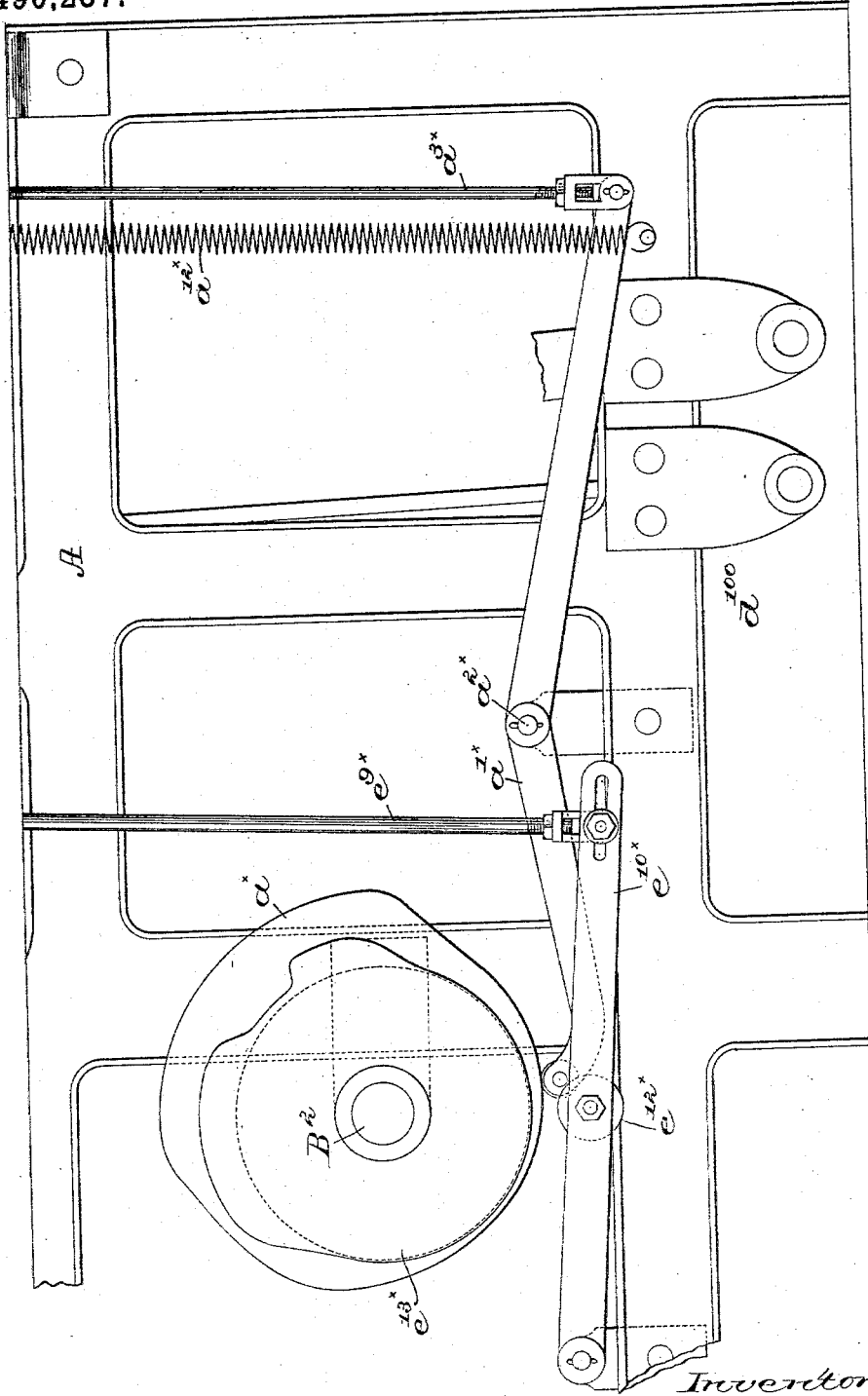

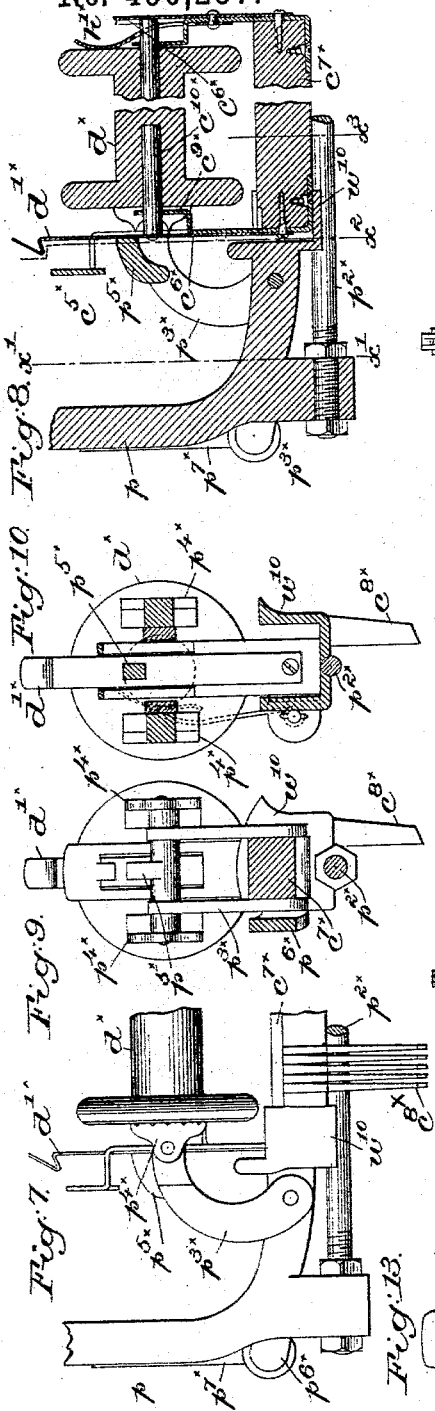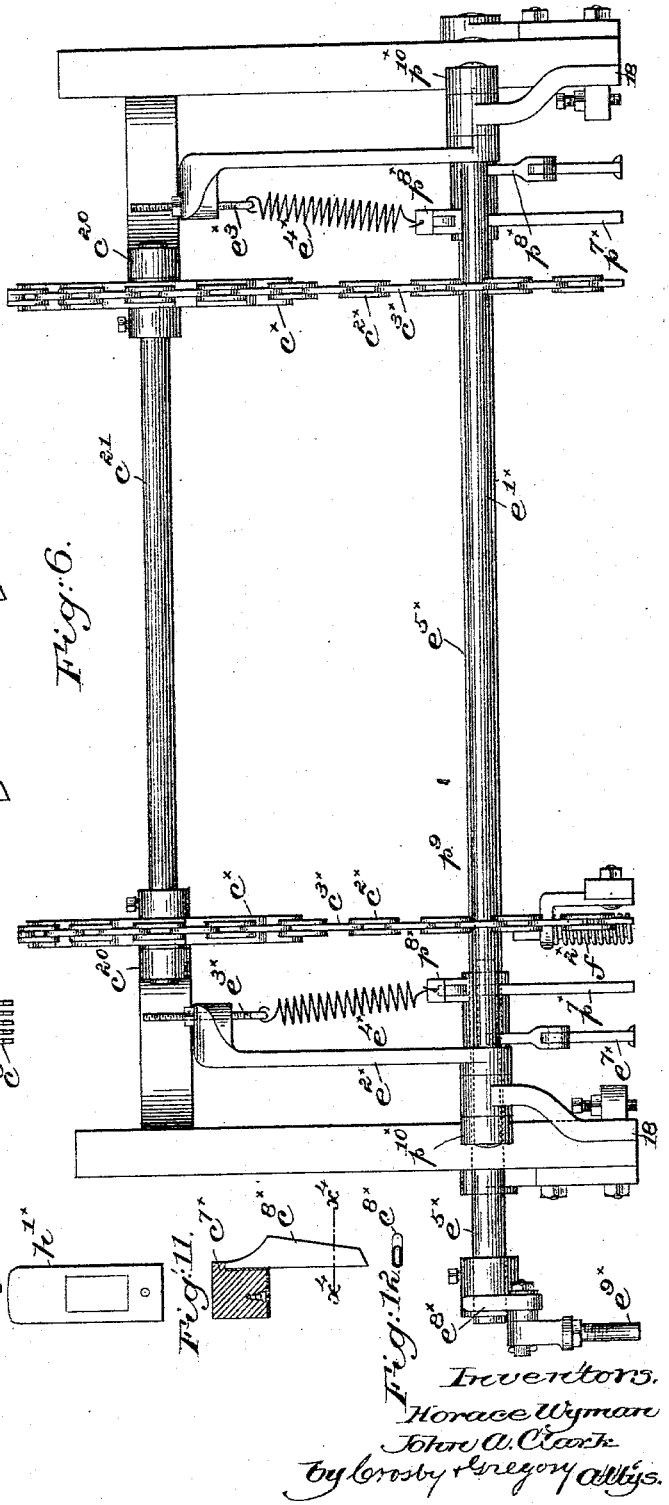

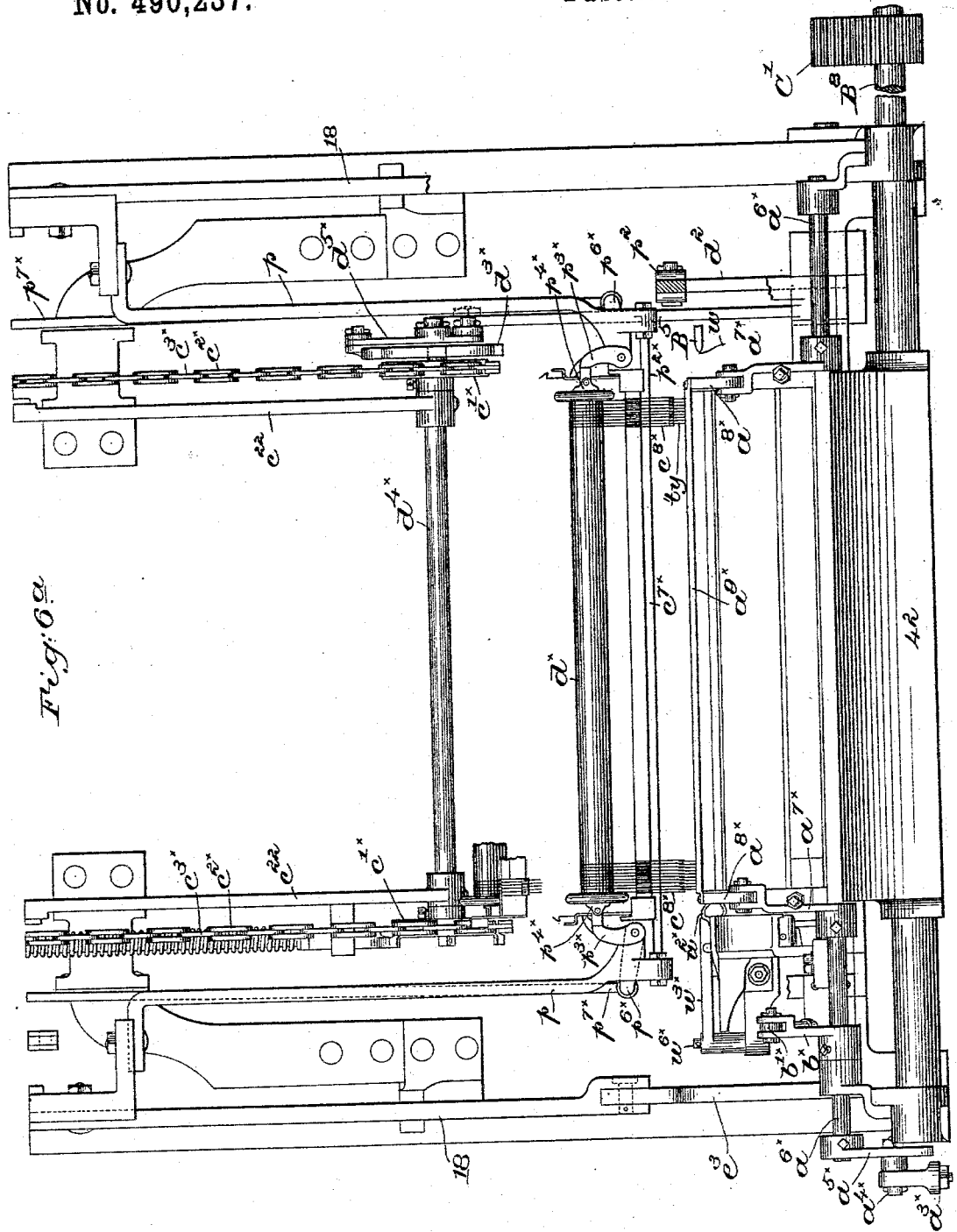

(No Model.) 7 Sheets—Sheet 6.
H. WYMAN & J. A. CLARK.
LOOM FOR WEAVING TUFTED FABRICS.
No. 490,237. Patented Jan. 17, 1893.
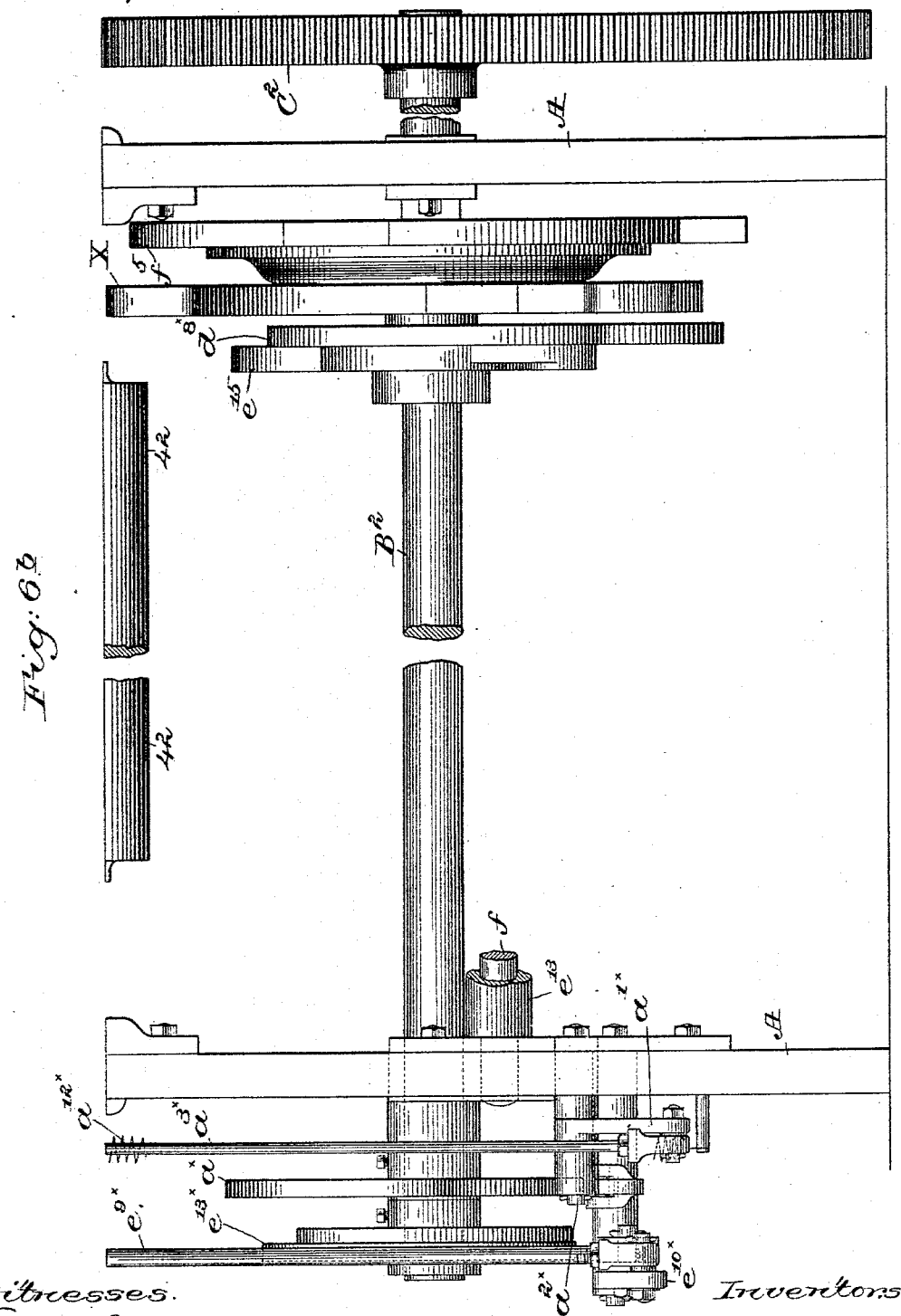

(No Model.) 7 Sheets—Sheet 7.
H. WYMAN & J. A. CLARK.
LOOM FOR WEAVING TUFTED FABRICS.
No. 490,237. Patented Jan. 17, 1893.
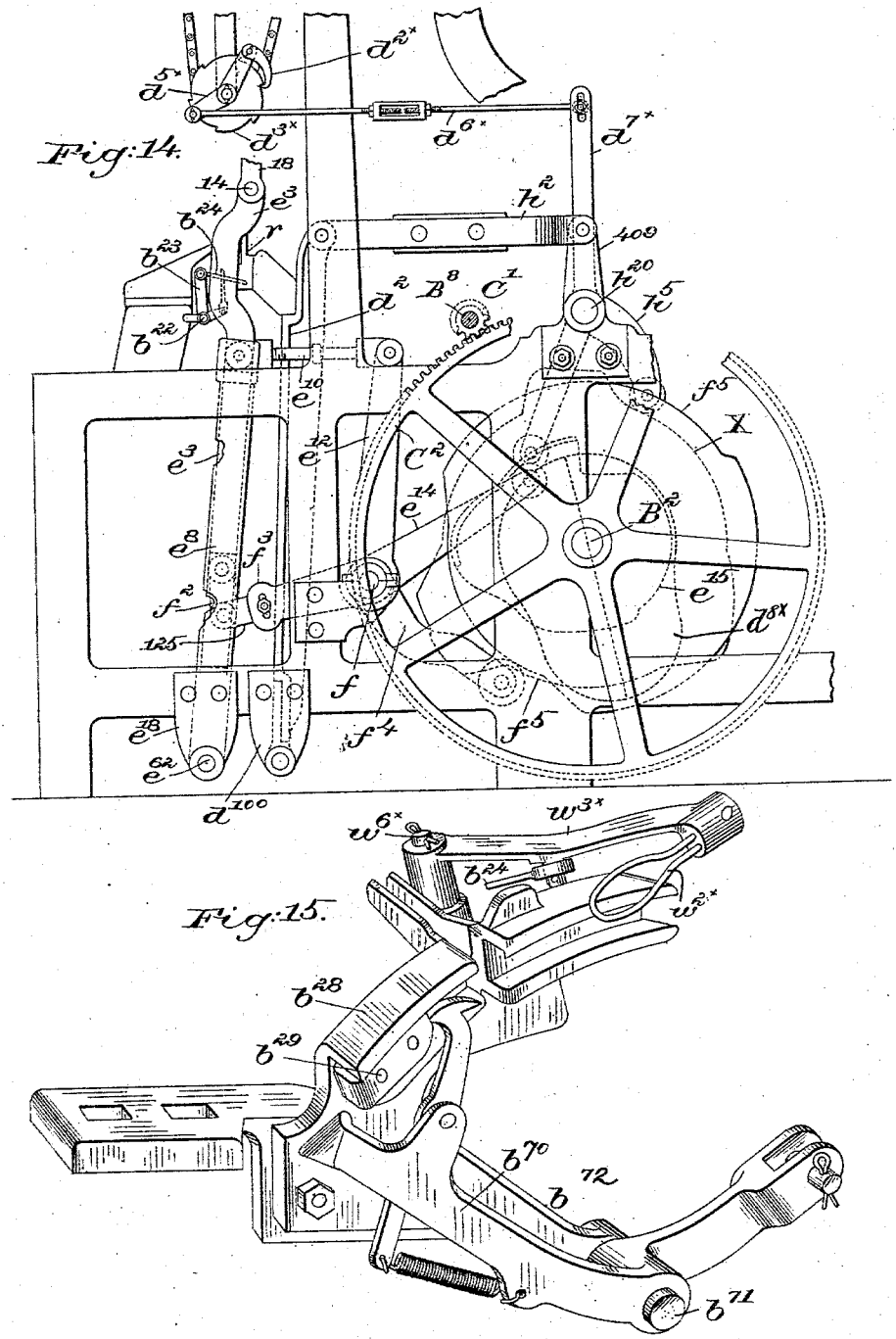

UNITED STATES PATENT OFFICE.

HORACE WYMAN AND JOHN A. CLARK, OF WORCESTER, MASSACHUSETTS, ASSIGNORS TO THE CROMPTON LOOM WORKS, OF SAME PLACE.

LOOM FOR WEAVING TUFTED FABRICS.

SPECIFICATION forming part of Letters Patent No. 490,237, dated January 17, 1893.

Application filed June 13, 1892. Serial No. 436,418. (No model.)

*To all whom it may concern:*

Be it known that we, HORACE WYMAN and JOHN A. CLARK, of Worcester, county of Worcester, State of Massachusetts, have invented an Improvement in Looms for Weaving Tufted Fabrics, of which the following description, in connection with the accompanying drawings, is a specification, like letters and figures on the drawings representing like parts.

This invention has for its objects to improve and simplify that class of looms for weaving tufted fabric in which the tuft yarns are wound side by side upon beams carried by an endless chain, the beams having their journals in carriages provided with a series of quills or yarn carriers one for each yarn and through which the said yarns have their free ends projected, the quills or carriers when a beam is taken from the chain being inserted into the shed between parallel warp threads so as to leave the free end of each tuft yarn above the warp threads in the upper plane of the shed, a weft carrier having a suitable weft being passed through the shed and crossing the said tuft yarns then in the shed between their free upturned ends and the quills or carriers.

One part of our present improvements relate to a novel manner of handling the beams when taking them from and putting them back into the chains; and to clamps and operating devices for holding and releasing the tuft yarn beam at desired times. In the production of tufted fabrics in looms having quills or carriers to present the tuft yarns, it is a great desideratum to draw the tuft yarn loops snugly about the weft, to thus avoid waste of yarn. To improve the tufted fabric, and at the same time reduce the waste of tuft yarn to a minimum, we, after the insertion of a weft across the tuft yarns, clamp or restrain the rotation of the tuft yarn beam and before the beat of the reed to strike said weft, we lift the said yarn beam which results in drawing the tuft yarns up snugly by and around the weft and preferably the said beam while so clamped will be lifted sufficiently to cause the free ends of said tuft yarns to be drawn down toward the body warps, thus leaving the said free ends substantially at the level desired for the two legs of the loop or tuft when completed. We have also provided the loom with a selvage shuttle thread controller which is so mounted as to turn about a vertical pivot or center, such position of the center and such movement of the controller obviating all tendency of the said controller to be drawn toward the selvage when the weft carrier is being retracted, thus enabling the selvage to be kept in proper straight line.

Our invention, therefore, consists in a loom for weaving tufted fabrics, said loom containing the following instrumentalities, viz:—a tuft-yarn beam; a carriage provided with a series of quills or tuft-yarn carriers; devices to clamp or lock said beam to restrain the rotation thereof; and devices to lift said beam while clamped or locked to thereby pull upon the tuft-yarns and draw their free ends down into the fabric and leave them substantially the desired distance from the body of the fabric, substantially as will be described.

Other features of our invention will be hereinafter described and designated in the claims.

Figures 1, 1ª, and 1ᵇ, taken together show a sufficient portion of the left hand side of a loom embodying our invention to enable the same to be understood; Fig. 2 is a detail showing a part of one of the tuft yarn beam carrying-chains, with a carriage in position therein, the said parts also showing portions of the transferring mechanism, which is about to engage one end of the carriage and remove it from the chain; Fig. 3 is a partial rear side elevation of the carriage, and the tension device mounted upon it, adapted to act directly upon the tuft yarns wound upon the tuft yarn beam, the tuft yarn beam being, however, omitted; Fig. 4 is a section on the line *x* Fig. 3; Fig. 5 is a sectional detail on an enlarged scale, it showing simply the tuft yarn beam, one of the quills or carriers, a tuft yarn, and some of the body warps, the shed being open; Figs. 6, 6ª and 6ᵇ, taken together represent the front of the loom,—said figures showing a sufficient portion of the loom to enable our invention to be understood; Fig. 7 is an enlarged detail similar to Fig. 2, but showing the transferring mechanism as having taken the carriage and its tuft-yarn beam from the chain; Fig. 8 is a longitudinal vertical section of the parts shown in Fig. 7, the opposite end of the carriage and beam being also represented, the carriage and beam being broken out centrally to save space upon the drawings; Fig. 9 is a section in the line $x'$, Fig. 8 looking to the right; Fig. 10 is a section in the line $x^2$; Fig. 11 is a section in the line $x^3$ of only the carriage, the said figure showing, however, one of the quills or tuft yarn carriers not shown in Fig. 8; Fig. 12 is a section in the line $x^4$ Fig. 11; Fig. 13 is a detail showing by itself the piece $h'^\times$; Fig. 14 is a partial right-hand side elevation of the lower part of the loom. Fig. 15 is a detail of the mechanism for actuating the shuttle containing the weft thread to lock the double filling.

For the purpose of illustrating our invention in one form we have chosen to embody the same with and as an improvement upon the looms described in United States Patents No. 446,402, dated February 10, 1891, and No. 446,177, dated February 10, 1891, and herein to save unnecessary drawings and description, we shall, as far as practicable, use letters and figures such as therein employed to designate parts common to the said patents. The framework A is and may be of suitable shape to sustain the working parts. The frame-work contains suitable bearings for a main or power shaft $B^3$, having upon it a pinion $C'$ which engages a large gear $C^2$ fast upon the main cam shaft $B^2$, the said shaft having mounted upon it the lay cam X, which in its rotation acts upon an arm $h^5$, the hub of which is feather-keyed upon a rock-shaft $h^{20}$, the upper end of the said arm, marked 409, being connected by a suitable link $h^2$ with an ear attached to or forming part of the lay $d^2$ carrying the reed $r$, consisting essentially of a series of upright fingers. The lay $d^2$ is pivoted upon a suitable stand $d^{100}$, and is vibrated at the proper times in order to beat in the tuft-yarns $ty$ and the weft-thread $w$ about which they are looped, preparatory to cutting off the tuft yarns to constitute a series of tufts.

In practice the lay has connected to it at or near each end like rods $h^2$, so that it is operated positively at both ends, and in practice the weft employed to lock the tuft yarns in the shed will preferably be introduced by means of a needle or device substantially such as referred to in the said United States Patent No. 446,177.

The loom frame has at each side a suitable stand, as $e^{18}$, to receive the pivot $e^{62}$ for an arm $e^8$, the upper end of which has connected to it a rod $e^{10}$ jointed to the upper end of a lever $e^{12}$, connected to or forming part of a hollow sleeve $e^{13}$ surrounding the rock-shaft $f$, and having an arm $e^{14}$ which is actuated upon by a cam $e^{15}$. The sleeve referred to has two arms $e^{12}$ connected in like manner with the two arms $e^8$. The rock-shaft $f$ referred to, it having bearings in a suitable stand, has an arm $f^3$ to which is adjustably connected an arm 125, jointed by a link $f^2$ to slide bars $e^3$, the said rock-shaft $f$ having an arm $f^4$ which is acted upon by a cam $f^5$, so that the said slide bars have a vertical movement along the said arms $e^8$, while the latter are being vibrated about the pivot $e^{62}$. The upper ends of the slide bars $e^3$ are jointed at 14 to a part of a transferring frame 18, it having at each side of the loom a transferring arm $p$ which is adjustably mounted thereon.

42 represents a roller, in practice provided with suitable pins not shown, by which to take away the woven material; and 123 represents the breast beam.

In practice, the parts so far referred to by letters and figures may be and are substantially the same as the parts designated by like letters and figures in United States Patent No. 446,402, with the exception of the manner of mounting or pivoting the transferring frame 18 at its upper end, and the different use to which the arms $p$ in this present instance are put, the said frame being called a swing frame in said patent.

It will be understood that the loom herein to be described will in practice have a tuft cutting or shearing mechanism, substantially such as provided for in the said Patent No. 446,402.

The cam shaft $B^2$, at the left hand end of the loom, has a cam $a^\times$, which in its rotation acts upon the roller or other stud of a lever $a'^\times$ pivoted at $a^{2\times}$, the outer end of the said lever being jointed to a rod $a^{3\times}$ loosely connected by a bolt $a^{4\times}$ adjustably secured in a slotted part of an arm $a^{5\times}$ fast upon a rock-shaft $a^{6\times}$ located at the front of the breast beam 123, said rock-shaft having arms $a^{7\times}$ near each end to which are pin-jointed rods $a^{8\times}$, said rods supporting at their free ends a tuft yarn pusher $a^{9\times}$, it serving to support the free ends of the tuft yarns and keep them above the upper plane of the warps while a weft carrier is inserted to cross the tuft yarns between their free ends and the ends of the quills or carriers, and the filling having been inserted, the carriage to be described, containing the quills or tuft yarn carriers, is lifted, and while being lifted is swung forward toward the breast beam, the reed advancing until it pushes the tuft yarns bent about the weft, up nearly to the front edge of the tuft yarn pusher. The forward movement of the tuft yarn pusher is determined by the shape of the cam $a^\times$ referred to, but to better insure its exact position required or desired we have connected with the rock-shaft $a^{6\times}$ an arm $b^\times$, having jointed to it a rod $b'^\times$, provided with an adjustable collar $b^{2\times}$, which is struck during the forward movement of the lay by an ear $b^{3\times}$ attached to or moving with the lay $d^2$, but we wish it to be understood that this rod, collar and projection may be dispensed with, if desired. The reed having come sufficiently forward, it in connection with the tuft yarn pusher aids in wrapping the bent ends of the tuft yarns about the weft rather snugly, the upward movement of the carriage to be described containing the tuft yarn beam, the latter at such time being locked and restrained as against rotation, causing the loops of the tuft yarns to be drawn up closely to and about the weft, or while the beam is locked and is being lifted the free ends of the tuft yarns are drawn downwardly to the shed so as to leave said free ends above the body of the warps and of substantially the length desired for the tufts, and then the reed in its further movement carries the tuft yarns, bent about the weft, forward to the fell, the tuft yarn pusher moving back toward the fell in unison with the reed, when the tuft yarn pusher and the reed quickly return, another pick of filling is inserted in the shed, and the reed is thrown forward to beat in the said pick to thus additionally lock the tuft yarns, and immediately thereafter the tuft yarn beam is unclamped by the devices which formerly restrained its rotation, and the tuft yarn beam is lifted, causing the tuft yarns yet connected with the fabric to be pulled off the tuft yarn beam the latter then rotating, and when a sufficient length of tuft yarn has been drawn off to leave ends of suitable length for the next row of tufts to be made from that tuft yarn beam, the usual cutting mechanism comes forward and severs the tuft yarns, leaving the row of tufts completed. During the cutting-off operation, or just before, the clamp device again engages the tuft yarn beam and prevents the same from rotating during the cutting-off operation, and as the shears are moved away, the tuft yarn beam is transferred back again, as will be described, to the chain.

Referring again to the rock-shaft $a^{6 \times}$, it will be noticed that the cam $a^{\times}$ is not depended upon to carry forward the tuft yarn pusher, but rather to retract it, the said pusher being thrown forward by means of a suitable strong spring $a^{12 \times}$, the spring being preferably for determining the forward movement, as the latter will prevent any damage to the loom in case the tuft yarn pusher is unduly obstructed in its movements.

The chain employed for carrying the carriages and tuft yarn beams will be sustained upon suitable sprocket wheels, as $c^{\times}$, $c'^{\times}$, on suitable shafts $c^{21}$ and $d^{4 \times}$ mounted respectively in rigid bearings $c^{20}$ and $c^{22}$ suitably supported from the loom frame. These chains, one at each side of the loom, will in practice be composed of double links $c^{2 \times}$ and single links $c^{3 \times}$, the double links being employed to provide suitable spaces, as $c^{4 \times}$ (see Fig. 2), for the reception of the ends $c^{5 \times}$, of the arms $c^{6 \times}$, connected rigidly to the opposite ends of the carriages $c^{7 \times}$, to which are suitably attached the quills or tuft yarn carriers $c^{8 \times}$, said quills being each preferably composed of a hollow metal tube, as best represented in Fig. 12; but this invention is not limited to the particular shape of the quills or tuft yarn carriers, and instead of the particular quills or tuft yarn carriers, shown, we may employ any other usual or suitable equivalent devices. The arm $c^{6 \times}$ referred to has connected to or formed preferably as an integral part of it a lug or bearing $c^{9 \times}$ which receives the journal $c^{10 \times}$ of the tuft yarn beam $d^{\times}$. The arm $c^{6 \times}$ has co-operating with its suitable spring catch $d'^{\times}$ so shaped that when the end $c^{5 \times}$ of the arm $c^{6 \times}$ is pushed into an open space $c^{4 \times}$, the shoulder near the upper end of the spring $d'^{\times}$ will pass behind and engage the rear side of the double link $c^{3 \times}$, thus confining the carriage to the chain, it remaining in and traveling with the chain in its step by step movement, by or through the pawl $d^{2 \times}$ engaging the ratchet wheel $d^{3 \times}$ (see Fig. 14) fast on the shaft $d^{4 \times}$ carrying the sprocket wheels $c'^{\times}$, the said pawl being mounted upon a suitable pawl carrier $d^{5 \times}$ loosely mounted upon the said shaft $d^{4 \times}$, the pawl carrier deriving its movement from a link $d^{6 \times}$ attached to an arm $d^{7 \times}$, the hub of which is mounted loosely upon the rock-shaft $h^{20}$, before described, the lower end of the arm $d^{7 \times}$ being acted upon by a suitable cam $d^{8 \times}$ see Figs. $6^b$ and 14, fast upon the main cam shaft $B^2$, the said cam being shown by dotted lines in Fig. 14.

It will be understood that the tuft-yarn beams will be provided with a series of tuft-yarns wound thereon side by side in colors arranged in accordance with the colors desired for each individual tuft in each particular row of tufts to be made.

The transferring arms $p$ are substantially such as are contained in the said Patent No. 446,402, with the exception of slight differences in the construction at their lower ends, which we will now describe.

Each transferring arm $p$ has its lower end turned inwardly somewhat to form a sort of open V-shaped box $w^{10}$ to embrace at the desired times the opposite ends of each carriage $c^{7 \times}$, and extended from one to the other of the said arms $p$ is a rod $p^{2 \times}$ which serves as a stop or aligning rod against which the rear sides of the quills $c^{8 \times}$ normally rest when the clamp to be described is not acting on the beam and while the arms $c^{6 \times}$ are being put into and connected with the chains. The lower ends of the transferring arms $p$ have pivoted upon them a clamp or beam locking device herein represented as composed of a sort of yoke $p^{3 \times}$ and rocking blocks $p^{4 \times}$, preferably having serrated or friction faces to the more positively and better engage the ends of the tuft-yarn beam, which will be preferably of wood. The yoke $p^{3 \times}$ carrying the clamping devices is provided between said clamping devices with a lug or spring releasing finger $p^5$, see Figs. 8 and 9, which when a tuft-yarn beam is to be removed from the chain, contacts with the outer face of the spring arm $d'^{\times}$, then engaging a link of the chain, and pushes the said spring arm toward the end of the tuft-yarn beam and away from the chain, thus enabling the carriage to be easily removed from the chain. This removal of a carriage is effected by raising the transferring arms $p$ until the box-like portions $w^{10}$ embrace its ends as in Figs. 7 to 10, and then the locking device or clamp is moved forward positively against the end of the beam, see Fig. 7, and thereafter as the arms are lowered, the tuft-yarn carriage, and the beam, and its attached parts, are removed from the chain and lowered so that the quills pass into the shed between parallel warps, as before stated, the free ends of the tuft-yarns at such times being supported by the tuft-yarn pusher, then in its forward position.

The clamp referred to has an arm $p^{6\times}$, to which is jointed a link $p^{7\times}$ connected at its upper end to an elbow lever $p^{8\times}$ mounted loosely upon a stud $p^{9\times}$ of a lever $p^{10\times}$, having its fulcrum on a rod $p^{12\times}$ extended across the loom frame; see Fig. 1. In practice there are two levers like the one marked $p^{10\times}$, one just within the loom side at each side of the loom, and said levers carry a rod $e'^{\times}$ which serves as the pivot for the arms 18 before referred to, as constituting part of the transferring frame. Each arm $p^{10\times}$ has an upright or stand $e^{2\times}$ forming a rigid part thereof, said upright receiving, as shown, an adjustable eye $e^{8\times}$, to the lower end of which is connected a spring $e^{4\times}$ attached to one of the said elbow levers $p^{8\times}$, the said spring normally acting to elevate the said rod $p^{7\times}$ and cause the clamping device to firmly engage the tuft-yarn beam, and to effect the release of the spring catch $d'^{\times}$ from the chain.

The release of the hold of the clamp referred to, which may be of the form represented herein, or of any other suitable form to effect the result stated, is effected as herein shown by or through a rock shaft $e^{5\times}$, having its bearings in suitable hubs of the arm $p^{10\times}$, the said rock shaft having an arm $e^{6\times}$ near each end which is connected by suitable links $e^{7\times}$ with one arm of said elbow levers $p^{8\times}$.

The rock shaft $d^{5\times}$ has a second arm $e^{8\times}$, shown best in Fig. 1, to which is adjustably jointed the upper end of a connecting rod $e^{9\times}$, attached at its lower end, preferably in an adjustable manner, to a lever $e^{10\times}$, see Fig. 1$^b$, said lever having a suitable roller or other stud, as $e^{12\times}$, which is acted upon by a cam $e^{13\times}$ fast on the shaft B$^2$. In Fig. 1$^b$, the said roller stud $e^{12\times}$ is represented as out of contact with the cam $e^{13\times}$, as will be the case when the clamps are engaging the tuft-yarn beam firmly, as represented in the drawings.

The sprocket wheel $c'^{\times}$ will in practice be acted upon by a suitable locking device $f'^{\times}$, which may be a T-headed slide-bar acted upon by a suitable spring $f^{2\times}$, as shown best in Fig. 1$^a$, the said locking device serving to prevent any movement of rotation of the chains and sprocket wheels except that due to the action of the pawl $d^{2\times}$ before described.

The chief function of the tuft-yarn pusher is to stand across the warps in the upper plane of the shed at a point between the fell and the reed at the time that the tuft-yarn carriers are descending into the shed, the said pusher occupying such position with relation to the tuft-yarns and tuft-yarn carriers as to aid in keeping the free ends of the tuft-yarns above the warps in the upper plane of the shed.

This invention is not limited to the exact position of the pusher, as its position will vary according to the particular manner and direction of movement of the carriers. The pusher aids in keeping the tuft-yarns in bent form after having been crossed by the weft and while the reed is acting to carry the tuft-yarn loops to the fell.

We have shown two clamps, one acting against each end of the tuft-yarn beam being used, but we desire it to be understood that the use of a clamp against but one end of the beam would answer the purpose and be within the scope of our invention. The up and down movement of the transferring arms acts to place the ends of the carriers into the shed, and a pick of weft $w$ having been laid, fold the tuft-yarns near their ends about the weft, the to and fro movement of the ends of the said carriers in the direction of the movement of the reed aiding in trailing the tuft-yarns in the shed sufficiently to form a passage between the free ends of the tuft-yarns and the carriers on one side and the upper warps on the other side for the pick of weft, and on its movement in the other direction, the weft having been laid, the reed aids the carriers in moving the folded yarns forward to the fell.

In order that the pusher may be put into its operative position, the tuft cutting mechanism employed, which may be as in the Patent No. 446,402, referred to, will be put out of its operative position.

This invention is not limited to the use of only the particular shown devices for actuating the tuft-yarn carriers in their specific movements in folding the tuft-yarns around the weft thread and in the transference of the tuft-yarns to the fell while so folded about the weft thread; and the rigid clamping of the tuft-yarn beam is also applicable to any mechanisms of whatever form wherein it is desired to pull on the tuft-yarns and cause them to be drawn tightly around the weft thread.

The tuft-yarn pusher is applicable for use in connection with any forms of carriers and moving devices therefor, wherein it is desired that the free ends of the tuft-yarns be left above the warps and be supported thereby while the yarns are being drawn tightly around the weft thread.

Referring now to the detailed view, Fig. 15, $b^{28}$ represents the curved shuttle race in which is the reciprocating shuttle $b^{29}$ carrying the locking thread for the thread of the weft carrying needle which will be used, it inserting its thread double. This shuttle will derive its reciprocating movement from a vibrating lever $b^{70}$ pivoted on a stud $b^{71}$ of an arm $b^{72}$ forming part of the shuttle race. This lever $b^{70}$ may be oscillated by any suitable device, as for instance, a lever substantially such as marked $b^{70}$ in said Patent No. 446,402. The weft locking thread carried by the shuttle $b^{29}$ is extended through a loop-like eye $w^{2\times}$ of a lever $w^{3\times}$ constituting a thread controller, said lever turning about a vertical pivot $w^{6\times}$, the said eye occupying its forward position toward the fell while the weft-carrying needle $B^5$, Fig. 6ª, is being projected through the shed to leave a loop outside that selvage most distant from the starting point of the said needle, said loop being caught by the locking thread contained in the shuttle $b^{29}$, and as the said weft needle is retracted, and the lay moved backwardly away from the breast beam, the shed being open, the thread controller is moved backwardly away from the breast beam so as to hold a portion of the shuttle thread substantially parallel with the selvage warp, while the weft thread needle completes its back stroke and the reed beats the filling into the fell. In the Patent No. 446,402 referred to, the said weft controller was made as a finger swinging about a horizontal pivot, and in practice it has been found that excessive strain on the shuttle thread during the beating in of the weft pulls the shuttle thread laterally to such an extent as to somewhat affect the smoothness and regularity of the selvage, so to overcome this difficulty we have mounted the arm of the weft controller upon the vertical pivot $w^{6\times}$, it being erected upon an extension of the shuttle race frame, so that under no conditions in weaving can the weft controller be pulled or sprung in toward the selvage warps.

We have not herein shown the devices for imparting motion to the vibrating lever employed for reciprocating the shuttle in its race, but the lever may derive its movement by or through devices substantially such as are employed in United States Patent No. 446,402.

The arm $w^{3\times}$ of the shuttle thread controller has jointed to it at a short distance from its fulcrum a link $b^{24}$, see Fig. 14, which in turn is jointed to an arm $b^{23}$ fast to a rock shaft $b^{22}$, said link, arm, and rock shaft being substantially the same as the like devices designated by like terms in Patent No. 446,402, except that herein, owing to the fact that the movement given to the weft thread controller to put the shuttle thread substantially parallel with the selvage thread is in an opposite direction from that in the patent referred to, consequently the arm $b^{23}$ in this present invention is extended upwardly from the shaft $b^{22}$ instead of downwardly. In practice, the rock-shaft $b^{22}$ will co-operate with suitable devices at its opposite end, as in Patent No. 446,402, to effect the stopping of the loom in case the shuttle thread breaks. The cam $e^{13\times}$ is so shaped as to cause the spring $c^{4\times}$ to release its effective control of the clamp employed, and engage the tuft yarn beam and prevent its rotation at suitable times in the operation of the loom, and especially is this the case when the tuft yarn beam is being lifted after beating in the tuft yarns, and preparatory to cutting off the tuft yarns, for as the tuft yarn beam is being lifted just preparatory to the cutting action, the beam must be free in order that the tuft yarns may rotate it sufficiently to pay off a proper length of tuft yarns and leave the ends of the said yarns for the next row of tufts to be made from that beam projecting below the ends of the quills or carriers.

It will be understood that at times during the transferring operation of the tuft yarn carriers from and into the chains, the tuft yarn beam might by accident be rotated, so to prevent this we have secured to the rear side of each tuft yarn carriage a spring device $g'^{\times}$ having connected with it a friction pad $g^{2\times}$ which is kept pressed constantly against the mass of tuft yarn upon the tuft yarn beam, the friction being sufficient to prevent any accidental rotation of the tuft yarn beam during the operation of the loom.

In Fig. 6ª, we have shown a little of the point of the weft carrying needle $B^5$ carrying the weft thread to be inserted double into the shed. In practice this needle will and may be actuated as and by devices such as shown in United States Patent No. 446,177 for that purpose.

In Fig. 6ª, we have shown a little of the weft, and some of the tuft yarns $ty$, and it will be supposed that the ends of the tuft yarns will at such time rest on the pusher as represented in the enlarged detail Fig. 5. The shuttle $b^{29}$ is in this instance of our invention vibrated in the arc of a vertical circle and in a vertical plane at right angles to the line of reciprocation of the needle $B^5$. The thread controller is vibrated in a horizontal plane and has its open eye arranged so that the needle $B^5$ passes through it far enough to have the loop of weft, carried by the needle, entered by the shuttle $b^{29}$. The thread from the shuttle $b^{29}$ is passed through the eye of the thread controller and to the selvage at the cloth making point. After the loop of weft laid in double form has been entered by the shuttle $b^{29}$ the needle $B^5$ is retracted and in this motion as soon as it is withdrawn from the eye of the thread controller the thread controller is started toward the rear of the loom, so as to put tension upon the weft thread coming from the shuttle $b^{29}$ and hold the same under strain while the double weft carried by the needle $B^5$, then being retracted, is drawn about the weft thread, the double weft being beaten up by the shed, its loop being held firmly at the selvage by the thread coming from the shuttle $b^{29}$.

Having described our invention, what we claim as new, and desire to secure by Letters Patent, is:—

1. In a loom for weaving tufted fabrics, the following instrumentalities, viz:—a tuft-yarn beam; a carriage provided with a series of quills or tuft-yarn carriers; means to prevent the rotation of said beam, and while restrained from rotation to lift said beam and draw the tuft-yarns tightly around the pick of weft, substantially as described.

2. The tuft-yarn carriage; its attached quills or tuft yarn carriers; and tuft-yarn beam; combined with devices to lift the tuft-yarn carriage and beam; a clamp; and devices to cause it to release the said tuft-yarn beam as the said beam is lifted after the bent free ends of the tuft-yarns have been drawn back into the warp about the filling, such upward movement of the tuft warp beam and carriage while the beam is unclamped and the tuft-yarns are caught in the shed resulting in rotating the tuft-yarn beam and pulling off sufficient tuft-yarn for the next row of tufts to be made from the yarns of that beam, substantially as described.

3. In a loom the following instrumentalities, viz:—a tuft-yarn carriage; a series of quills or tuft-yarn carriers; a tuft-yarn beam; a beam clamp or locking device; and devices to actuate the same, whereby the clamp or locking device for the said beam is at times made to act against and restrain the rotation of the beam, and at other times to permit the rotation of the beam, for the purposes set forth.

4. The tuft-yarn beam, the carriage on which it is mounted, and transferring arms adapted to engage the said carriage, and operating means for said arms combined with a clamp to co-operate with the head of the said beam, and actuating devices for the said clamp, substantially as described.

5. A transferring frame having transferring arms shaped to engage the ends of a tuft-yarn carriage; and a tuft-yarn beam clamp, and actuating devices therefor, combined with a tuft-yarn carriage having a series of quills or carriers; a tuft-yarn beam, and devices to raise and lower said transferring frame and to move it to and fro between the reed and the fell, substantially as described.

6. A transferring frame having transferring arms shaped to engage the two ends of a tuft-yarn carriage, and tuft-yarn beam clamps and their actuating devices, combined with a tuft-yarn carriage, its attached series of quills or carriers, a tuft-yarn beam, devices to raise and lower said transferring frame and also to move it to and fro between the reed and the fell, and a tuft yarn pusher adapted to occupy a position across the warps of the open shed to arrest and keep above the warps the free ends of the tuft-yarns during the descent of the quills into the shed, substantially as described.

7. In a loom for weaving tufted fabrics, the following instrumentalities, viz:—two chains; means to actuate them intermittingly; a series of tuft-yarn beams; a series of tuft-yarn carriages having each a series of quills or carriers, means to connect said carriages to said chains and support said beams; a clamp to engage the beam being used, devices to actuate said clamp to clamp and to release said beam at intervals, and means to take the said beams from the said chains at intervals and cause the ends of the tuft-yarn carriers to be moved up and down and to and fro with relation to the warps and the fell, whereby the tuft-yarns are trailed in the shed but with their free ends above the warps to present the tuft-yarns in position to be crossed by the weft and the tuft yarns are then drawn up and folded between their free ends and the carriers snugly about the weft before the said tuft-yarns are cut off, substantially as described.

8. A tuft-yarn carriage having a series of quills or carriers, and bearings for a tuft yarn beam; combined with a tuft yarn beam, and a pad and spring, the pad acting directly against the yarn on said beam, substantially as described.

9. The transferring arms shaped to engage the tuft-yarn carriages; a transferring frame on which the said arms are mounted; a clamp, and a rod connecting said arms, combined with chains, and tuft yarn carriages provided with quills or carriers and tuft yarn beams, to operate, substantially as described.

10. The combination with a tuft-yarn beam having a series of quills or carriers for tuft-yarns, and devices to support said tuft-yarn beam and move the ends of the carriers to and fro, and up and down, of a clamp to positively engage said beam and prevent its rotation while the tuft-yarns are being drawn up in loop form about the weft, substantially as described.

11. The combination with the weft shuttle-race and weft-shuttle, of the weft thread controller mounted on a vertical pivot located at the side of the shuttle-race most remote from the selvage, substantially as described.

12. In a loom for weaving tufted fabrics, a tuft-yarn carriage having attached quills or tuft-yarn carriers, and a tuft-yarn beam having its journals mounted on bearings of the said carriages, combined with two sets of clamps adapted to act against the ends of the said beam from opposite directions and clamp the said beam between them, substantially as described.

13. In a machine for weaving tufted fabrics, a transferring frame and tuft-yarn carriage having tuft-yarn carriers and tuft-yarn beam, and devices to raise and lower said frame with the beam and carriers, and to move the ends of the carriers to and fro between the reed and fell of the fabric, combined with a tuft-yarn pusher, substantially as described.

In testimony whereof we have signed our names to this specification in the presence of two subscribing witnesses.

HORACE WYMAN.
JOHN A. CLARK.

Witnesses:
JUSTIN A. WARE,
SAMUEL B. SCHOFIELD.